(12) United States Patent
Checchinato

(10) Patent No.: US 11,897,750 B2
(45) Date of Patent: Feb. 13, 2024

(54) SYSTEM AND METHOD FOR AUTONOMOUS FILLING OF CONTAINERS

(71) Applicant: Gabriel Gelli Checchinato, Jundiaí (BR)

(72) Inventor: Gabriel Gelli Checchinato, Jundiaí (BR)

(*) Notice: Subject to any disclaimer, the term of this patent is extended or adjusted under 35 U.S.C. 154(b) by 0 days.

(21) Appl. No.: 16/772,769

(22) PCT Filed: Dec. 14, 2018

(86) PCT No.: PCT/BR2018/050463
§ 371 (c)(1),
(2) Date: Jun. 13, 2020

(87) PCT Pub. No.: WO2019/113669
PCT Pub. Date: Jun. 20, 2019

(65) Prior Publication Data
US 2020/0307983 A1    Oct. 1, 2020

(30) Foreign Application Priority Data

Dec. 14, 2017 (BR) .......................... 10 2017 026974

(51) Int. Cl.
*B67D 1/12* (2006.01)
*B67C 3/28* (2006.01)
(Continued)

(52) U.S. Cl.
CPC ................ *B67D 1/12* (2013.01); *B67C 3/284* (2013.01); *B67D 1/0888* (2013.01); *G01F 23/292* (2013.01); *B67D 2001/1263* (2013.01)

(58) Field of Classification Search
CPC .................. B67D 1/0888; B67D 1/124; B67D 2001/1263; B67D 2210/00036;
(Continued)

(56) References Cited

U.S. PATENT DOCUMENTS 3,760,166 A * 9/1973 Adams .................. G06M 1/101
377/6
4,192,613 A * 3/1980 Hammar .............. G01B 11/105
356/639
(Continued)

FOREIGN PATENT DOCUMENTS

CN      104083091 A    10/2014
CN      203873568 U    10/2014
(Continued)

OTHER PUBLICATIONS

English translation of Zhou (CN 104083091) published Oct. 8, 2014.*
(Continued)

*Primary Examiner* — Timothy P. Kelly
(74) *Attorney, Agent, or Firm* — Miller IP Law

(57) ABSTRACT

Provided is a system (1) for autonomous filling of a container (5), comprising: a fluid dispenser (9); a distance (11); a plurality of electromagnetic radiation emitters (2) and receivers (3); a user interface (6) configured to receive a desired percentage of the height of the container (5) to be filled with liquid; and a controller electronically connected to the distance sensor (11), the plurality of emitters (2) and receivers (3), the user interface (6) and the fluid dispenser (9).

16 Claims, 8 Drawing Sheets

(51) Int. Cl.
*B67D 1/08* (2006.01)
*G01F 23/292* (2006.01)

(58) Field of Classification Search
CPC . B67D 3/0025; H01L 27/14643–14663; F25D 23/126; F16P 3/144
See application file for complete search history.

(56) References Cited

U.S. PATENT DOCUMENTS

| | | | |
|---|---|---|---|
| 4,437,499 A | 3/1984 | Devale | |
| 5,266,810 A | 11/1993 | Murphy | |
| 5,596,186 A * | 1/1997 | Kobayashi | E21B 49/006 250/214.1 |
| 6,040,544 A * | 3/2000 | Schantz | B07C 5/368 209/576 |
| 7,673,661 B2 * | 3/2010 | Chase | B67D 1/1236 141/360 |
| 8,109,301 B1 * | 2/2012 | Denise | G07F 9/023 141/360 |
| 9,274,510 B2 * | 3/2016 | Burger | F16P 3/14 |
| 2001/0035492 A1 * | 11/2001 | Estevez-Garcia | G01V 8/12 250/221 |
| 2006/0100827 A1 * | 5/2006 | Kim | G01D 3/08 702/189 |
| 2008/0216504 A1 * | 9/2008 | Kim | B67D 1/0005 62/338 |
| 2011/0260059 A1 * | 10/2011 | Jiang | H01L 27/14625 250/330 |
| 2013/0228250 A1 | 9/2013 | Agam et al. | |
| 2014/0231633 A1 * | 8/2014 | Parodi-Keravec | G01V 8/14 250/216 |
| 2014/0232262 A1 * | 8/2014 | Wu | H05B 45/20 315/33 |
| 2015/0135728 A1 * | 5/2015 | Swanson | F25B 21/02 62/3.64 |
| 2016/0207753 A1 * | 7/2016 | Choi | B67D 1/1238 |
| 2018/0201492 A1 * | 7/2018 | Jung | B01D 35/04 |
| 2018/0335297 A1 * | 11/2018 | Maclean | G01J 1/44 |

FOREIGN PATENT DOCUMENTS

| | | |
|---|---|---|
| EP | 0270923 A1 | 6/1988 |
| EP | 1647951 A1 | 4/2006 |
| KR | 100755142 B1 | 9/2007 |

OTHER PUBLICATIONS

International Search Report of PCT/BR2018/050463, published on Jun. 20, 2019.
Written Opinion of PCT/BR2018/050463, published on Jun. 20, 2019.

* cited by examiner

SYSTEM AND METHOD FOR AUTONOMOUS FILLING OF CONTAINERS

CROSS-REFERENCE TO RELATED APPLICATION

This application is a national entry application of International Application No. PCT/BR2018/050463 filed on Dec. 14, 2018, which claims priority to Brazilian Application No. 10 2017 026974-4 filed on Dec. 14, 2017, the entire contents of which are herein incorporated by reference in its entirety.

TECHNICAL FIELD

The present invention relates to a system and a method of autonomous filling of containers of different materials, shapes and sizes, aiming to provide convenience and practicality to its users. the system and the method aim to avoid the overflowing of the used container, as well as saving the user waiting time during the filling. In addition, another relevant feature of the present invention is to provide ease of use and practicality especially for the visually impaired.

The field of application of the invention is the segment of devices for filling the containers, being applied in liquid dispensers in general, such as water purifiers, filters, refrigerators, coffee makers, juice jars, electric coolers, among others.

TECHNICAL BACKGROUND

It is known that the filling of containers, be they glasses, jars or others, with liquid, which can be water, juice, soda or other, is done manually or according to predefined quantities of liquids.

The manual way is for the user to control the process of filling, that is, start the process by means of pressing a button or register, wait for the container to be filled to the desired level and, finally, interrupt the process with another activation of the button or register when the desired level is reached. This is the traditional method used for filling the containers, such as glasses and jars with liquids.

However, when filling a container according to this method, the user needs to wait while the container is being filled, which can cause inconvenience to the user. In addition, if he does not keep his attention toward completing the filling, the liquid may overflow from the container.

On the other hand, some devices allow filling according to predefined quantities of liquids, in which the user presses a button corresponding to the desired volume of liquid, this being released and the filling being stopped automatically.

Although this method solves the issue of the time spent by the user when monitoring the filling, it ends up making the process of filling complex and impractical, since it requires the use of containers with volumes compatible with those of the predefined quantities so that there is no overflow.

Below are provided some examples of the state of the art that aim to solve such problems, such as, for example, the document US20130228250 referring to a sensor system for acoustic detection in a liquid dispensing system. Said system comprises a first ultrasonic sensor for measuring the position of a container and a second ultrasonic sensor for measuring the edges of the container and the height of the liquid column inside.

Document CN203873568 refers to a water dispenser comprising a micro controller, which is connected to a temperature sensor to measure the temperature of the water in a water storage tank disposed in the water dispenser. The water dispenser comprises a control panel; a water outlet connected to the water storage tank body on the underside of the control panel; and a liquid level sensor on the underside of the control panel to measure the water level in the glass of water. The micro controller is also connected to a height detection sensor to measure the height of the glass of water.

Document US20180201492 relates to an automatic water supply device comprising a container seat portion; a water inlet member arranged at the top of the container seat, so as to supply a liquid to the container; a unit for measuring the height of the container and a unit for measuring the water level arranged so as to be adjacent to the water inlet element, respectively; and a control unit to compare the height of the container, which is measured by the unit of measurement of the height of the container, and the water level, which measures by the unit of measurement of the water level, checking if the water level inside the container reaches a predefined height or not, and adjusting the water level inside the container using the result of the verification, wherein the unit for measuring the height of the container comprises a plurality of first optical sensors to detect both ends of the upper end of the container, and can measure the height of the container in response to the result of detection by the first optical sensors.

Document PI0801186-9 discloses a sensor system for a refrigerator distribution system that is used to perceive the presence, the positioning, the height and the shape of a container located in a distribution well. When the presence of the container is perceived in the distribution well and the container is properly positioned with respect to a well distribution nozzle, a distribution operation can be performed. The actual dispensing operation is regulated based on the height and shape of the container. In this way, the distribution operations can only be carried out when a container is properly disposed in the distribution well and the distribution operation will be closed temporarily based on the size and shape of the particular container employed.

Document U.S. Pat. No. 8,109,301 relates to a refrigerator with a dispenser that includes an outlet and that is configured to distribute content over the outlet and along an outlet flow path. The refrigerator also includes a detection unit configured to detect user activity that is indicative of a desire to fill a container with content using the dispenser. The refrigerator also includes an optical system that is configured to, in response to the detection of the user activity, direct a beam of light along at least a portion of the distributor's outflow path to assist the user in positioning the container.

Document KR100755142 refers to a system for controlling the distribution of liquid in a container. Such a system comprises a container assembly part, a container detection sensor, an actuator, a plurality of light emitting elements and a plurality of light receiving elements, an ultrasonic wave emitter/receiver and a controller. The container mounting part mounts a container to a lower surface. The container detection sensor detects the mounting of the container on the bottom surface of the container mounting part. The actuator injects liquid in the container mounted on the container mounting part. The plurality of the light emitting elements and the light receiving elements measure the height of the container mounted on the container mounting part. The ultrasonic wave emitter/receiver measures the height of the liquid injected in the container. Finally, the controller activates the actuator and controls it to inject the liquid in the container.

As noted, the state of the art lacks low-cost solutions that completely automate the process of filling the container.

In addition, in face of the alternatives from the state of the art that aim to remedy such problems, solutions that eliminate the need for careful alignment of emitters and sensors for the measurement of the height, shape or presence of the containers are of great interest.

In view of the problems presented by the methods described above, the present invention seeks to propose a system and a method that make it possible to fill containers of varying sizes in a truly autonomous manner, without the need for standardization of containers or human interference during the process of filling.

The proposed system and method allow the user not to spend its time monitoring the process of filling, as well as it does not require the use of containers with compatible volumes, as it works with containers of different materials, shapes and sizes.

Furthermore, while other solutions require the user to activate buttons or registers to start the process of filling, the proposed system and method start and stop the process of filling automatically, providing greater convenience and practicality to the user.

Finally, the proposed system and method also solve another drawback that other solutions have, that is, the fact that they make it difficult for visually impaired persons to fill the containers.

DETAILED DESCRIPTION

Problems to be Solved

It is a goal of the present invention to propose a system and a method appropriate for autonomously filling the containers of different materials, shapes and sizes.

It is a goal of the present invention to propose a system and a method appropriate to be introduced in liquid dispensers in general, such as water purifiers, refrigerators, filters, coffee makers, juice jars, electric coolers, among others.

It is a goal of the present invention to propose a system and a method that facilitate the process of filling containers. By making the filling completely autonomous, the system and the method ensure that the container will not overflow regardless of its size.

Thus, the user does not need to spend its time waiting for the container to fill, just as he does not need to use containers compatible with specific volumes.

It is a goal of the present invention to propose a system and a method that start and stop the process of filling the container automatically.

It is a goal of the present invention to propose a system and a method capable of autonomously filling the containers with varying heights up to a percentage of the height of the container, defined by the user through a user interface.

It is a goal of the present invention to propose an autonomous system of filling the container that does not require a careful alignment of the emitters.

It is a goal of the present invention to propose an autonomous system of filling the container comprising electronic components with high tolerances for manufacturing variations or nominal values and, consequently, reduced cost.

Another goal of the present invention is to propose an autonomous system of filling the container comprising emitters and optical sensors of easy industrial application and low cost.

Another goal of the present invention is to propose an autonomous system of filling that eliminates the need to use emitters with very narrow or collimated beams.

Another goal of the present invention is to propose an autonomous system of filling that uses emitters with a wider focus than emitters with narrow or collimated beam.

It is a goal of the present invention to propose an autonomous system of filling the container that works satisfactorily under different lighting conditions.

Another goal of the present invention is to propose an autonomous system of filling containers, less susceptible to external interferences in the sensors, which can be caused by environmental variations in luminosity, temperature of the sensors, interference between sensors, among others.

Another goal of the present invention is to make it possible to detect the height of thin transparent containers, which require the detection of small variations in the intensity of the luminous beam of emitters.

It is also a goal of the present invention to propose an autonomous system of filling the container comprising sensors for detecting the height of the liquid column in the container less susceptible to interference caused by the edges of the respective container or by waves or low uniformity on the surface of the liquid being poured.

In addition, it is a goal of the present invention to propose a system and a method appropriate for reading the height of the liquid column inside a container while, at the same time, detecting the height of the container.

Finally, in addition to the benefits provided to the general public, the present invention is extremely useful for visually impaired people, as, with its application, it is no longer necessary to use vision to fill a container. Therefore, the invention can be considered an assistive technology.

SUMMARY OF INVENTION

One or more goals of the invention, aforementioned, among others, is (are) achieved by means of a system for autonomous filling of a container comprising:
a fluid dispenser;
a distance sensor;
a plurality of electromagnetic radiation emitters and receivers;
a user interface configured to receive a desired percentage of the height of the container to be filled with liquid;
a controller electronically connected to the distance sensor, the plurality of emitters and
receivers, the user interface and the fluid dispenser;
wherein the controller is configured to:
determine the height of the container from the plurality of emitters and receivers;
wherein determining the height of the container comprises:
switch each emitter on and off among the plurality of emitters and performing the
reading of the luminous intensity from a receiver corresponding to the emitter switched on;
determine the height of the container based on at least one receiver that had luminous intensity
readings within an individual reference range for each receiver;
determine the height of liquid in the container from at least one measurement of the
distance sensor;
determine a desired height of liquid in the container based on the height of the container
and the desired percentage of the height of the container to be filled with liquid;
compare the height of liquid in the container and the desired height of liquid; and control a flow of liquid from the dispenser to the container based on the height of liquid in the container and the desired height of liquid.

One or more goals of the invention, aforementioned, among others, is (are) achieved by means of a method for autonomous filling of a container comprising the steps of:
  determine the height of the container from a plurality of emitters and receivers;
  wherein determining the height of the container comprises:
  switch each emitter on and off among the plurality of emitters and performing the reading of the luminous intensity from a receiver corresponding to the emitter switched on; determine the height of the container based on at least one receiver that had luminous intensity readings within an individual reference range for each receiver;
  determine the height of liquid in the container from at least one measurement from a distance sensor;
  determine a desired height of liquid in the container based on the height of the container and the desired percentage of the height of the container to be filled with liquid received by a user interface;
  compare the height of liquid in the container and the desired height of liquid; and
  control a flow of liquid from a fluid dispenser in the container based on the height of liquid in the container and the desired height of liquid.

BRIEF DESCRIPTION OF DRAWINGS

The goals, technical effects and advantages of the system and the method object of the invention will be apparent to those skilled in the art from the detailed description below which makes reference to the attached figures, which illustrate an example embodiment, but not limitative of the invention.

EMBODIMENTS

Initially, it should be noted that the system and the method for autonomous filling of a container, objects of the invention, will be described below according to particular embodiments represented in FIGS. 1 to 8 attached, but not limitative, since their embodiment can be carried out in different ways and variations and according to the application desired by the person skilled in the art.

The use of the term "one" or "an" in this specification does not indicate a limited quantity, but the existence of at least (as a minimum) one of the elements/components/items listed. The use of the term "or" indicates any or all of the elements/components/items listed. The use of the term "comprises", "endowed", "provided" or a similar term indicates that the element/component/item listed in front of said term is part of the invention, but does not exclude other elements/components/items not listed. The use of the term "associate", "connect" or similar terms can refer to physical, mechanical, pneumatic, fluidic, hydraulic, electrical, electronic or wireless connections, either directly or indirectly.

The use of the term "light" or derivatives such as "luminosity" and "luminous" does not indicate only the visible portion of the electromagnetic spectrum, therefore covering all parts, such as infrared and ultraviolet, for example.

The use of the term "broad focus", "wide focus", "wide beam" or similar refers to emitters of electromagnetic radiation whose beams are slightly collimated and very divergent in relation to emitters of collimated and slightly divergent beams. In this context, a LED is considered to be a broad focus emitter in relation to a laser, for example.

Figure 1:
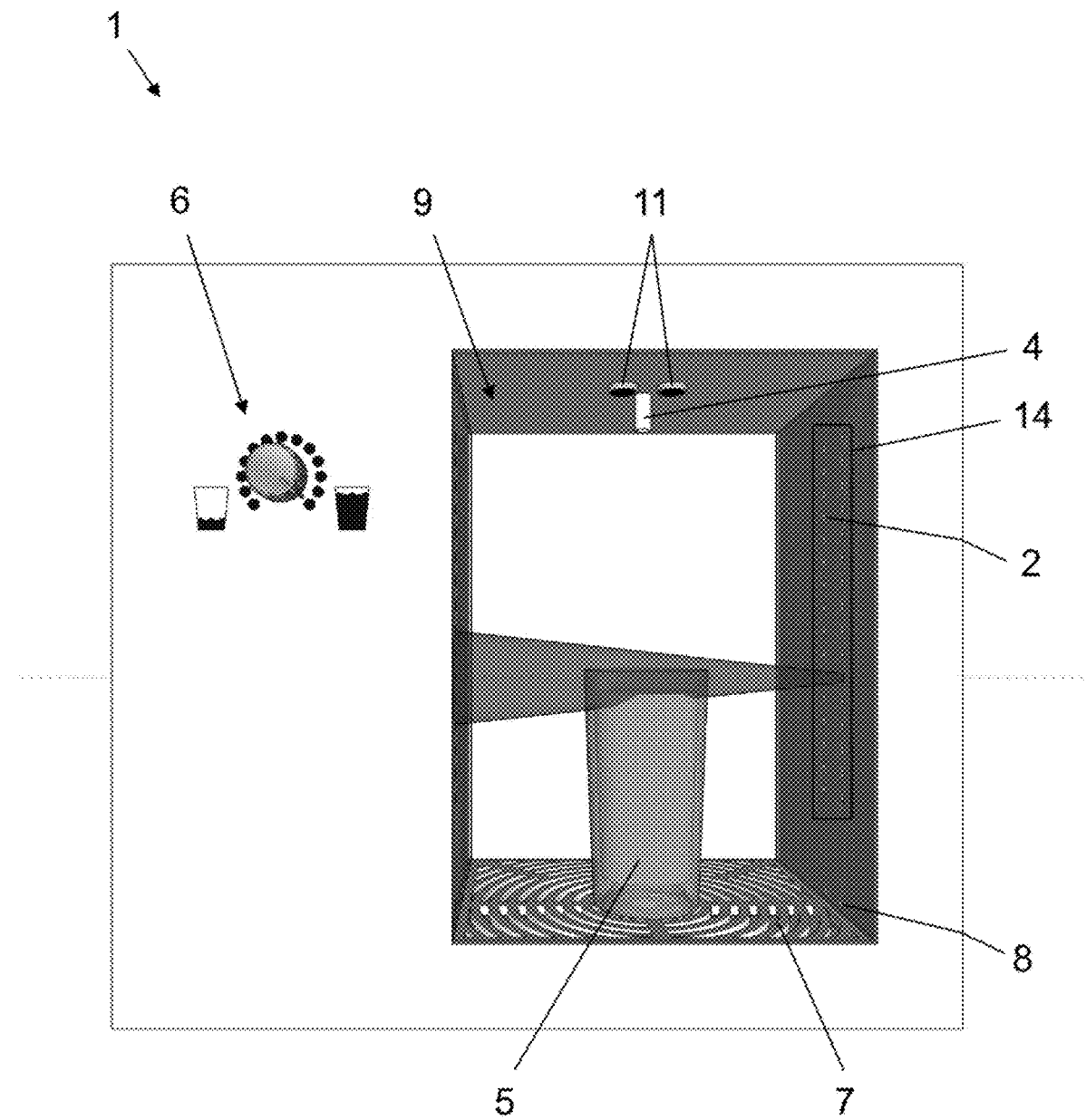
FIG. 1 shows a front view of the system for autonomous filling of a container, object of the present invention.
Figure 2:
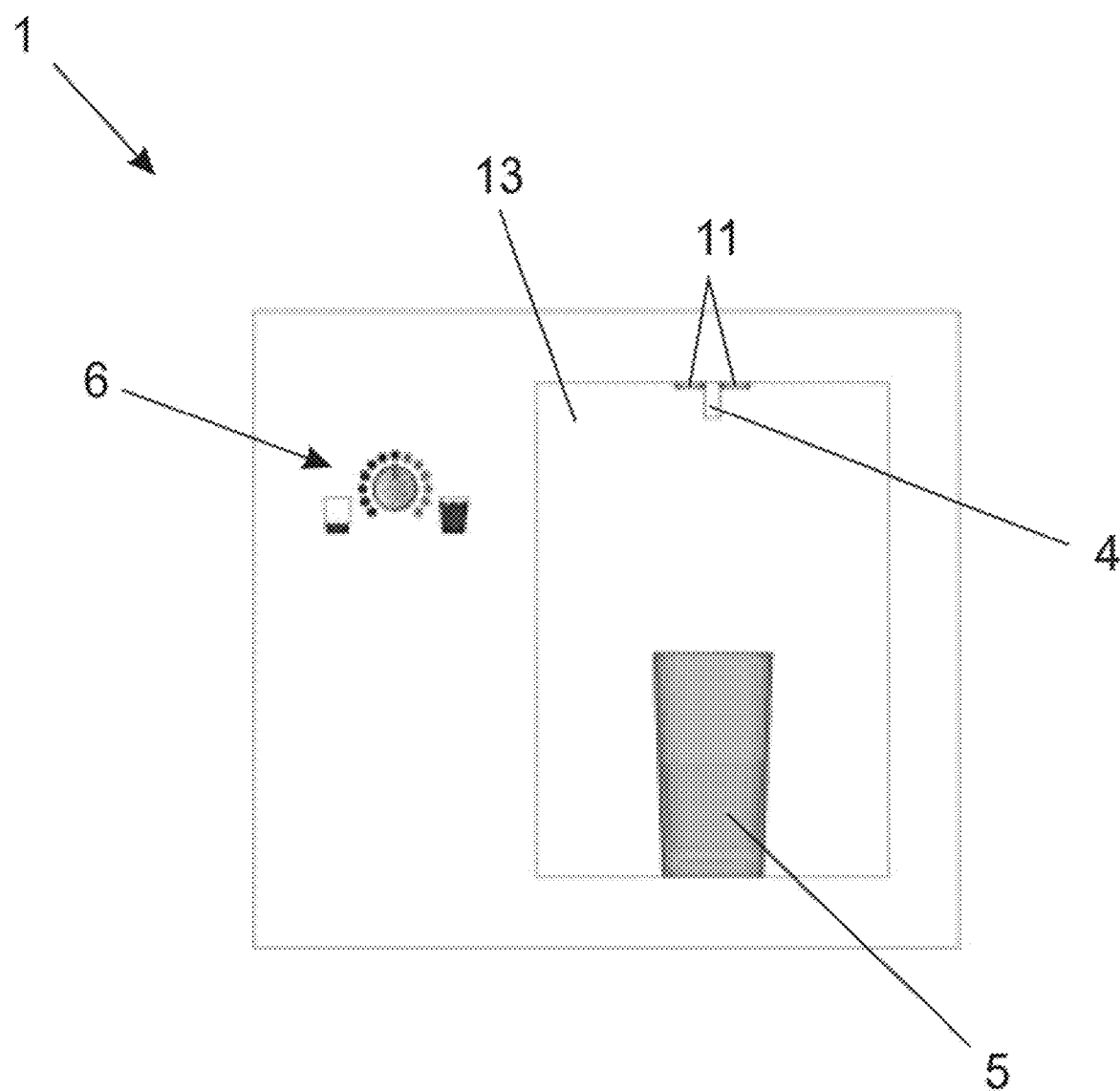
FIG. 2 shows a front view of the system comprising a container filled with liquid up to about half of its height.
Figure 3:
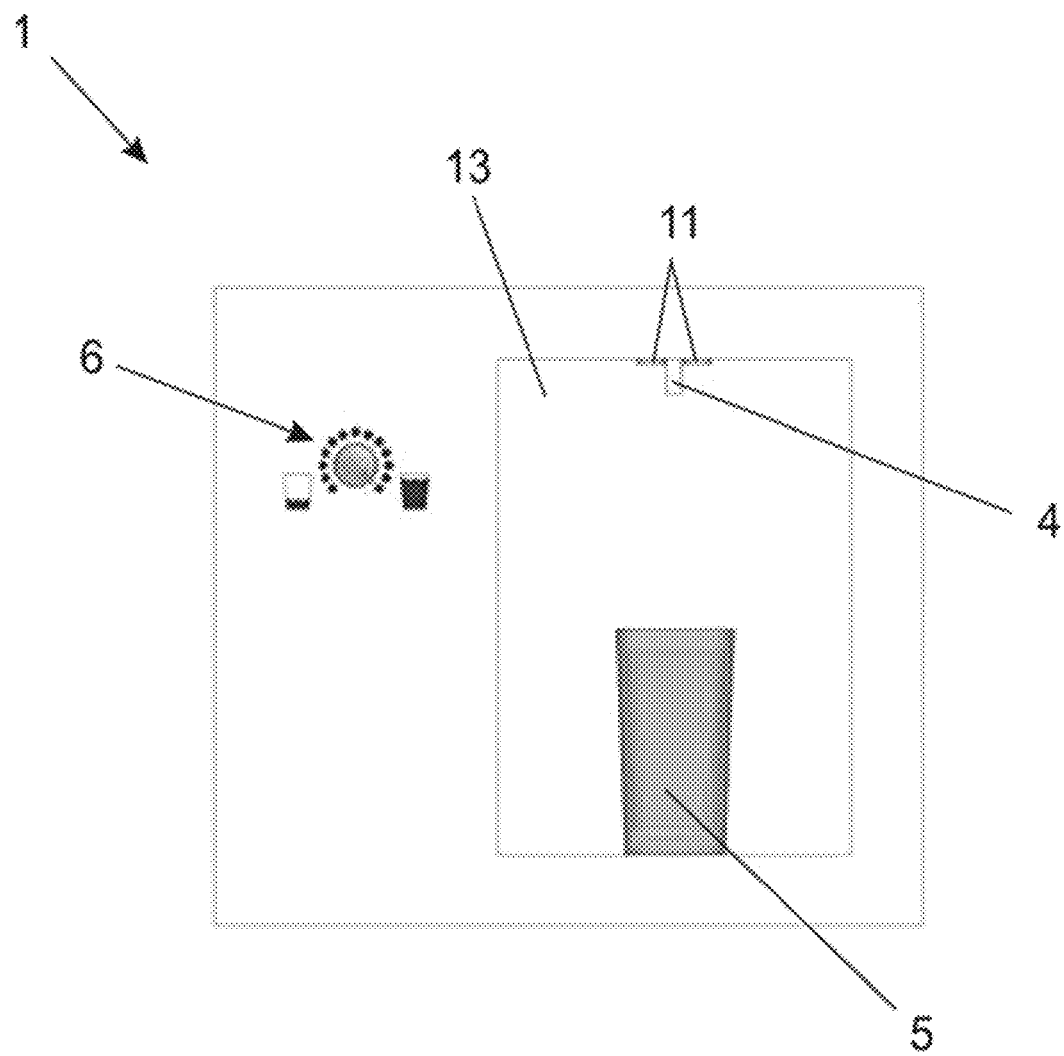
FIG. 3 shows a front view of the system comprising a container filled with liquid up to about its entire height.
Figure 4:
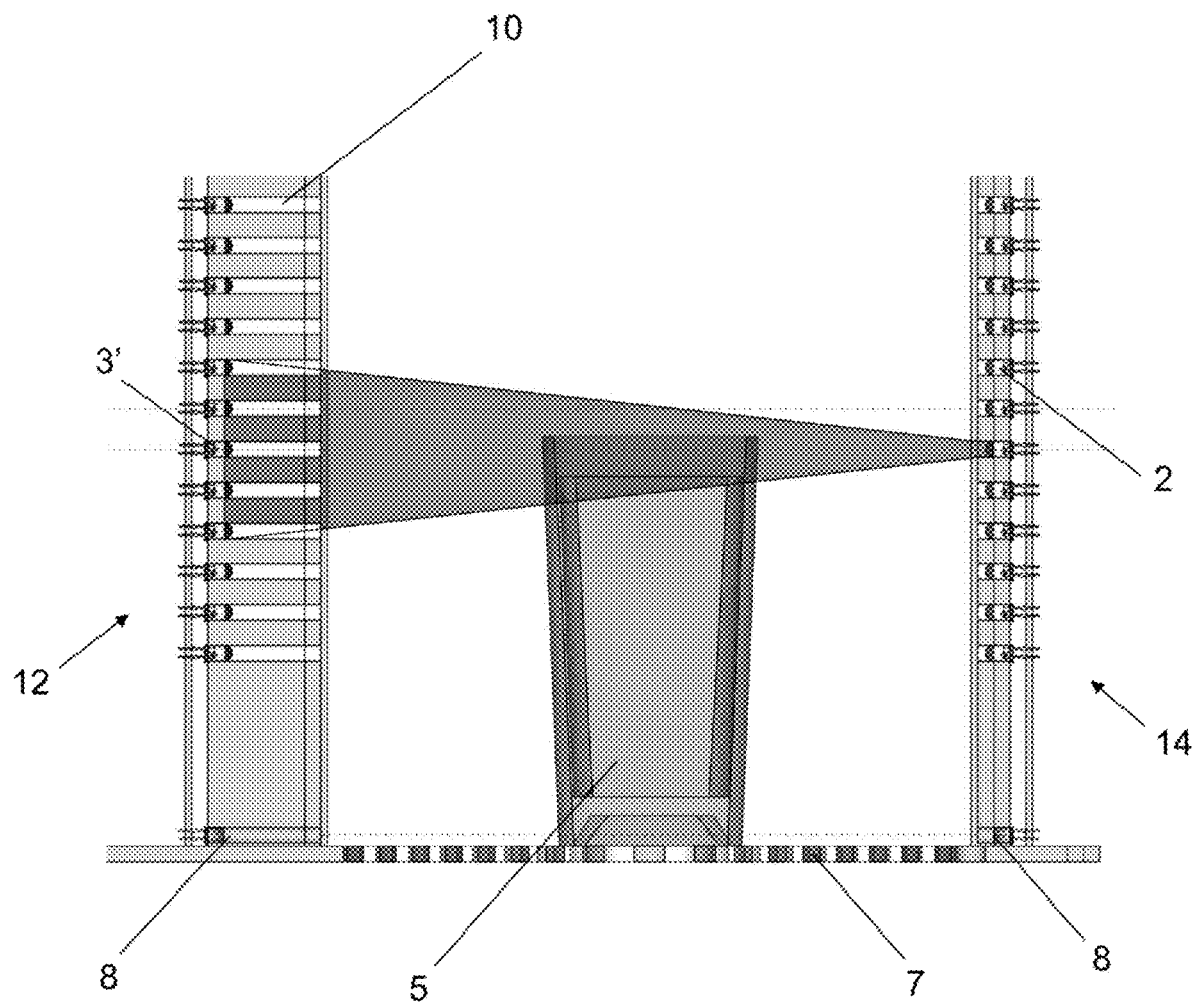
FIG. 4 shows a front sectional view of the system for autonomous filling of a container, object of the present invention.
Figure 5:
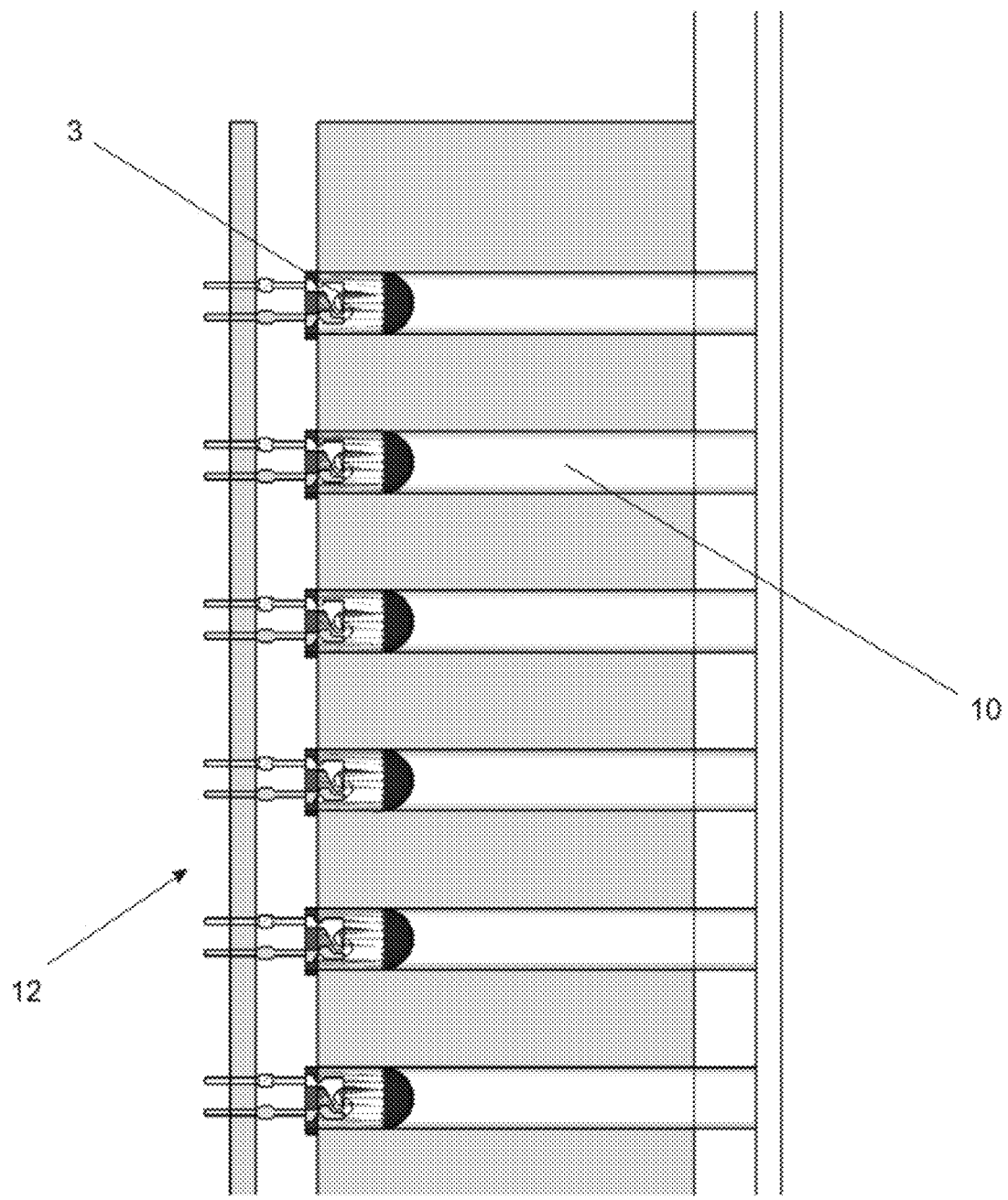
FIG. 5 shows an approximate and sectional view of the receivers arranged inside the grooves.

As can be seen from FIG. 1, this illustrates a system 1 for autonomous filling of a container 5. In an embodiment of the present invention, the system 1 comprises a fluid dispenser 9, a presence sensor 8, a distance sensor 11, a plurality of electromagnetic radiation emitters 2 and receivers 3, a user interface 6 and a controller (not shown).

The fluid dispenser 9 comprises any device appropriate for supplying fluids to a container 5, such as, for example, water purifiers, filters, refrigerators, coffee makers, juice jars, beer coolers and electric coolers.

Furthermore, the fluid dispenser 9 comprises a chamber 13 appropriate for receiving at least one container 5 on a base 7. Furthermore, the dispenser 9 comprises at least one dispensing nozzle 4 for supplying fluids to the container 5, such as, for example, water, juice, soda, beer, among others.

Finally, the dispenser 9 comprises a drive device (for example, a solenoid valve) connected to the controller, the drive device being responsible for controlling the flow of liquid to be inserted in the container 5.

In an embodiment of the present invention, the base 7 of the fluid dispenser 9 comprises embossed markings to facilitate the positioning of the container 5 in the dispenser 9. The embossed markings can be, for example, cracks or elevations in the shape of concentric circles arranged on the base 7, which help both conventional users and visually impaired people to find the correct place to position the container, in an intuitive manner.

Alternatively, the base 7 of the dispenser 9 may have a removable reservoir or a liquid sensor, as a safety measure to prevent overflowing of the dispenser 9.

Continuing, system 1 comprises, in an embodiment, a presence sensor 8 chosen from a group consisting of: an optical sensor, a pressure sensor, an electromechanical sensor and an ultrasonic sensor.

Preferably, the presence sensor 8 comprises an optical sensor consisting of one or more pairs of electromagnetic radiation emitter 2 and receiver 3, located close to the base 7 of the fluid dispenser 9 or along its sides.

The emitters 2 and receivers 3 of the presence sensor 8 can be of the same type as the emitters 2 and receivers 3 intended for measuring the height of the container.

Preferably, the optical sensor uses emitter 2 and receiver 3 pairs positioned close to the base. Such positioning allows it to be detected if the container 5 has been lifted, as well as taking advantage of the fact that containers 5 commonly have bases with thicknesses or shapes conducive to at least partial obstruction of electromagnetic radiation beams.

It is recommended that emitter 2 and receiver 3 pairs are positioned at a distance greater than 3 mm from the base 7 to prevent accumulated drops of liquid from interfering with the reading of the presence of the container 5 in the dispenser 9.

Figure 7:
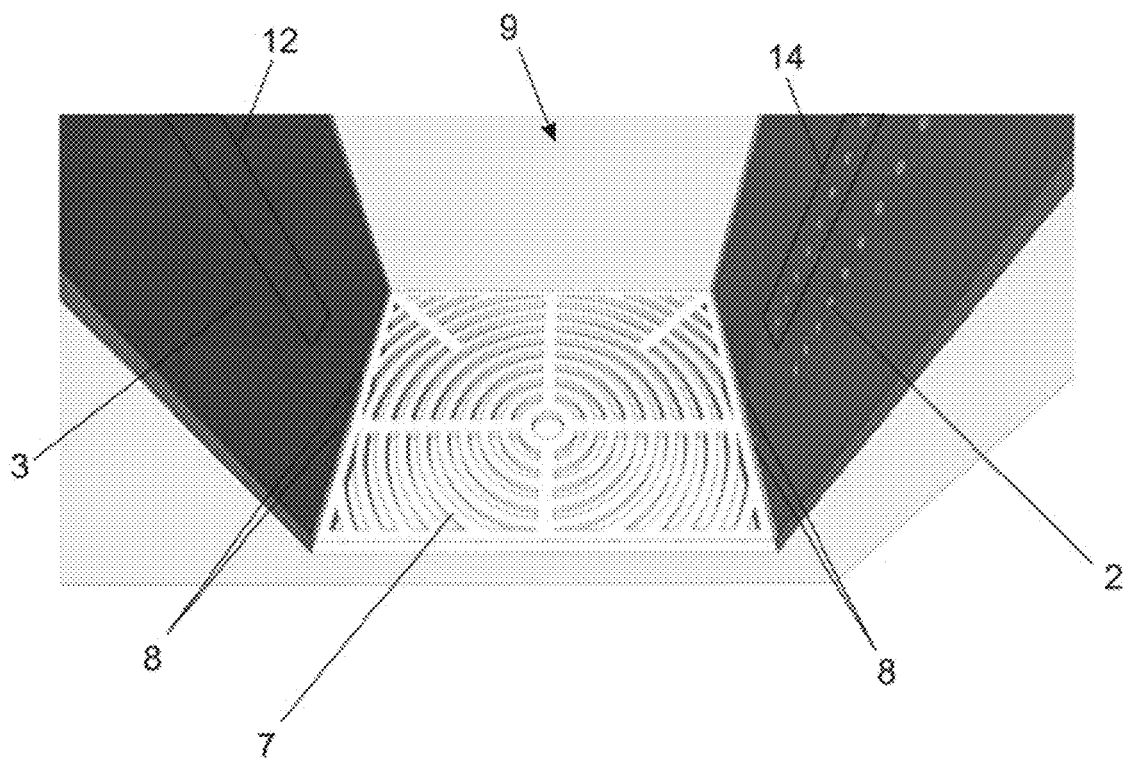
FIG. 7 shows a perspective view of the fluid dispenser according to an embodiment of the present invention.

Preferably, the presence sensor 8 is an optical sensor that uses two emitter 2 and receiver 3 pairs, as illustrated, for example, by FIG. 7, so that it is possible to detect if the container 5 is positioned incorrectly when analyzing whether both pairs were obstructed at least partially.

In general, the purpose of the presence sensor 8 is to function as an on/off button for the operation of the system 1, starting to fill the container 5 when it is supported on the base 7 of the dispenser 9 and interrupting it if the container 5 is removed from the base 7.

Alternatively, the function of the presence sensor can be assigned to an interface, such as a button to start the operation of the system 1, for example.

In an embodiment of the present invention, system 1 further comprises a distance sensor 11, which must be able to measure the distance between it and the top of the liquid column in the container 5.

In order for this distance to allow the height of the liquid column to be obtained, the controller is configured to assign as the height of the liquid column in the container 5 the difference between the distance of the distance sensor 11 up to the base 7 and the distance shown by the distance sensor 11, that is, from it to the top of the liquid column.

The distance sensor 11 can be, for example, an ultrasonic sensor or an optical distance sensor, which can have a component for emission and one for receiving signals or just a component for both functions.

Commonly, the distance sensors 11 are based on the technique of analyzing the speed of the signal and the round-trip time of the signal sent to calculate the distance until an obstacle. The use of sensors that emit narrow sound or luminous signals allows narrow necked containers to be used in the system 1.

Preferably, the distance sensor 11 is an ultrasonic sensor due to the existence of low-cost modules, the ultrasonic sensor being disposed adjacent to the dispensing nozzle 4 of the fluid dispenser 9.

In an embodiment, the distance sensor 11 is positioned on top of the location intended for the container 5, pointing in the direction of the center of the base 7 of the dispenser 9. When the container 5 is placed, the distance sensor 11 points to inside of the container 5 so that the emitted ultrasonic sound waves or luminous beams propagate perpendicular to the base 7 of the dispenser 9.

In order to reduce the level of interference generated by the edges of the container 5, you can adjust the power of the distance sensor 11 or consider only signals above a certain intensity as valid, discarding those reflected by the edges of containers, which are generally weaker. As an example, a resistor can be connected electrically in series to the distance sensor 11.

In an embodiment of the present invention, the electromagnetic radiation emitters 2 comprise LEDs or lasers, while receivers 3 comprise phototransistors, photodiodes or LDRs (Light Dependent Resistors).

The solar spectrum arriving at the Earth's surface has some frequency bands in which there is little electromagnetic radiation emitted, as well as artificial luminous sources. When analyzing them together, it is possible to find bands of wavelengths in which there is low emission of both.

As a result, are preferably used receivers 3 that work by receiving electromagnetic radiation with wavelengths within these ranges, because, in this way, external luminous interferences in receivers 3, which can easily prevent the operation of system 1, can be greatly reduced.

An example of wavelengths with the advantage presented are those in the infrared range from around 850 nm to around 940 nm, which also have the characteristic of not being visible to the user.

In an embodiment, the receivers 3 are arranged inside the grooves 10 and aligned to the emitters 2, so that they function less susceptible to interference from external sources, such as sunlight or artificial lighting, or from emitters 2 whose electromagnetic radiation beams emitted reach receivers 3 not intended for them.

In this way, the grooves 10 arranged in the fluid dispenser 9 advantageously reduce interference in the readings of the luminous intensity performed by the receivers 3.

Alternatively, emitters 2 can be arranged inside the grooves 10 if it is of interest, which can make their focus narrower.

The grooves 10 do not necessarily need to be cylindrical, and may have walls of different shapes for the same purpose, such as conical or serrated, for example. The length of the grooves 10 can vary widely, with values ranging from about 1 cm to about 4 cm.

In addition, grooves 10 can comprise walls coated or made with material of low reflexivity or high absorption of the portion of the electromagnetic spectrum being measured by the receiver 3, which contributes to the reduction of interference caused by external sources or by emitters 2 that reach receivers 3 not intended for them.

An example of a coating and material appropriate for receivers 3 of visible light and which, in some cases, also work for infrared, are paints or matte black materials.

Furthermore, the coating material of the grooves 10 can comprise paint or materials with reflectivity below 50% of the portion of the electromagnetic spectrum being measured by the receivers 3.

The plurality of emitters 2 and receivers 3 is used to identify the height of the container 5. In an embodiment of the invention, the presence of the container in the fluid dispenser 9 at least partially obstructs the path of the electromagnetic radiation beams emitted by the plurality of emitters 2 in the direction of the plurality of receivers 3. In this way, the reduction or elimination of luminosity is detected by the receivers 3.

Thus, the receiver 3' located in the highest position of the dispenser 9, that is, vertically in relation to the base 7 or along the axis of the height of the container furthest from the base 7 or the receiver 3' located in the position closest to the nozzle dispenser 4 or the top of chamber 13, which had readings of luminous intensity inside or outside a reference range or which detects a decrease that exceeds a reference value of the luminous intensity incident on it will determine the approximate height of the container 5, which will be registered by the controller.

In an embodiment, the distance between the receiver 3' and the base 7 corresponds to the height of the container 5. Therefore, the smaller the spacing between the receivers 3, the more accurate is the reading of the height of the container 5.

In addition, emitters 2 and receivers 3 can be arranged in one or more columns of emitters 14 and one or more columns of receivers 12. In this embodiment, emitters 2 of a column 14 point to receivers 3 of the other column 12, so that the trajectories of the emitted electromagnetic radiation beams are preferably parallel to the base 7 of the dispenser 9 and parallel to each other, thus crossing the location intended for the container 5.

The arrangement of emitters 2 and receivers 3 in at least two columns 14 and at least two 12 is particularly advantageous as it can assist in the detection of transparent containers due to the possible deviation caused by refraction of the electromagnetic radiation beams.

The deviation of the trajectory of the electromagnetic radiation beams generally decreases the luminous intensity identified by the receivers 3. For the deviation to occur, it is necessary that the electromagnetic radiation beam strikes obliquely to the surface of the container 5. With this, when using at least two columns with emitters 2 and at least two columns with receivers 3 instead of one column of each, it becomes inevitable to deviate by refraction in transparent cylindrical containers, for example, because, even if the cylinder has its center aligned with a column of electromagnetic radiation beams (in which case there is no deviation), the other column of electromagnetic radiation beams will focus obliquely to the circumference, causing deviation. This makes more effective the height detection of transparent containers and, in some cases, translucent containers.

Although the drawings illustrate system 1 with two columns 14 of emitters 2 and two columns 12 of receivers 3, it is worth mentioning that system 1 can also be carried out with one or more columns 14, 12, as well as with emitters 2 and receivers 3 arranged in different manners, such as, for example, matricially or diagonally.

In addition, as long as an emitter 2 has a corresponding receiver 3 to which it is aimed, emitter 2 does not necessarily need to be positioned next to other emitters 2, and there may be a mixture of emitters 2 and receivers 3 on the same surface of chamber 13.

In an embodiment of the present invention, a hydro-repellent or hydrophobic treatment is carried out on the fluid dispenser 9 or on the surfaces that isolate the chamber 13 from the emitters (2) and receivers (3), in order to avoid the accumulation of liquids in the in front of them.

In an embodiment of the present invention, are used receivers 3 encapsulated in a material that filters unwanted wavelengths from the electromagnetic spectrum, that is, with wavelengths different from those emitted by emitters 2, reducing the luminous interferences. Alternatively, a material or coating with the same function can be applied to the dispenser 9 or the receivers 3.

Another alternative is to place polarizing filters in the dispenser 9 or in the emitters 2 and receivers 3 to prevent unpolarized light from being captured by the receivers 3, thus reducing possible interferences.

In an embodiment of the invention in which the presence sensor 8 comprises emitter 2 and receiver 3 pairs positioned close to the base, if only the receivers 3 of the presence sensor 8 perform a reading of luminous intensity below their reference values, the height assigned to the container 5 is zero and the process of filling is not started. In this way, the presence of unwanted elements in the fluid dispenser 9, such as a hand, is prevented from inadvertently triggering the flow of liquid, which allows the visually impaired people to feel the base 7 and its markings to find the location intended for the container without risk of starting filling by mistake.

The system 1 further comprises a user interface 6 configured to receive a desired percentage of the height of the container 5 to be filled with liquid, for example, from 0 to 100%.

The user interface 6 is chosen from a group consisting of: rotary selectors (such as a potentiometer), sliding selectors, buttons, touchscreen displays and capacitive sensors.

Through the use of interfaces appropriate for touch, such as rotating or sliding selectors, it is possible to greatly improve usability for visually impaired people. In addition, the user interface 6 can display braille indications.

Figure 6:
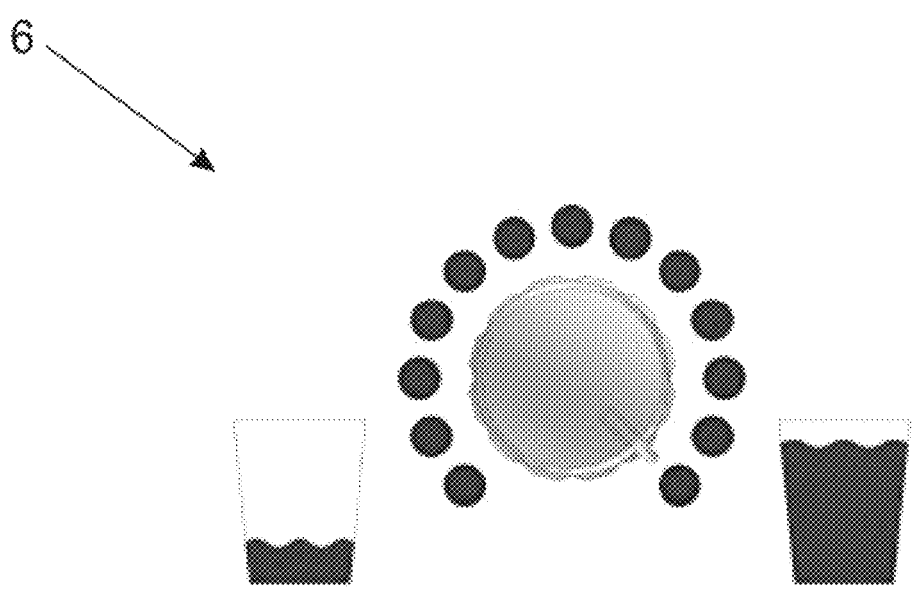
FIG. 6 shows an approximate view of the user interface according to an embodiment of the present invention.

In an embodiment of the present invention, the user interface 6 consists of a rotating selector with LEDs around it, which turn on according to the chosen percentage, in order to highlight it, as illustrated, for example, by FIG. 6. Also, the selector can comprise a "tooth" in high relief in order to facilitate the perception of its position by the touch.

In an embodiment of the present invention, the controller is electronically connected to the presence sensor 8, the distance sensor 11, the plurality of emitters 2 and receivers 3, the user interface 6 and the fluid dispenser 9.

In addition, the controller is configured to:

Determine the presence of the container 5 in the fluid dispenser 9 from the presence sensor 8:
  determine the height of the container 5 from the plurality of emitters 2 and receivers 3;
  determine the height of the liquid in the container 5 from one or more measurements of the distance sensor 11;
  determine a height to be filled with liquid in the container 5 based on the height of container 5 and the desired percentage of the height of the container 5 to be filled;
  compare the height of liquid in the container 5 and the desired height of liquid; and
  control a flow of liquid into container 5 based on the presence of the container 5 in the fluid dispenser 9, in the height of liquid in the container 5 and the desired height of liquid, stopping the flow if container 5 is not present or if the liquid in container 5 equals or exceeds the desired height of liquid.

In an embodiment of the invention, determining the height of the container 5 comprises sequentially and individually switching on and off each emitter 2 among the plurality of emitters 2 and perform the reading of the luminous intensity from a receiver 3 corresponding to the emitter 2 switched on; determine which receiver 3' was located in the highest position, that is, vertically in relation to the base 7 or along the axis of the height of the container furthest from the base 7 or closest to the dispensing nozzle 4 or the top of the chamber 13, which presented a luminous intensity value within a respective reference range, in which the height of such receiver 3 is considered to be the height of the container 5.

The individual reference value is determined based on a reading of the value presented by each receiver 3 for the luminous intensity detected when its corresponding emitter 2 is switched on and the container 5 is absent from the fluid dispenser 9. Depending on the method adopted for the detection of the height of the containers 5, none, part or all the other emitters 2 can be switched on, in the moment of the reading of the value displayed by each receiver 3.

If a single reference value is chosen for all the receivers 3, it must be below the lowest luminosity value presented by the receivers 3, since values below the reference value will indicate that something is at least partially obstructing the passage of electromagnetic radiation from emitters.

Normally, due to different lighting and temperature conditions, temperature changes in circuits during use, wear of emitters 2 and receivers 3 due to use or aging, repeatability of measurements, among other factors that cause interference, it is justified the use of a margin of safety next to the reference value, creating a reference range, which indicates at least partial blockage of the beam, for each receiver 3, thus ensuring greater reliability of the readings.

In addition, adding such interferences to factory variations of the electronic components used, there can be quite significant differences in the readings of the luminous intensity presented by each receiver 3, which can impair or hinder the measurement of the height of the containers when using a single value of reference for a plurality of receivers 3. With this, the present invention proposes the use of individual reference values for each receiver 3, which consequently generate reference ranges also individual for each receiver 3, in order to solve this problem without require strict manufacturing tolerances for the components, which occurs mainly in the measurement of transparent containers as they require the detection of small variations in luminous intensity.

In an embodiment of the present invention, the controller can be configured to perform a calibration of receivers 3, that is, read the readings or values presented by the receivers 3 and subtract an margin of safety adequate from each of them to obtain reference values which determine individual reference ranges and with a margin of safety for each receiver 3 automatically.

Such calibration can be programmed to be done in the first time that system 1 is started in case of a manual activation, which can be done by means of a "reset" button, for example, or by another interface.

Preferably, during such calibration, the reading of the value presented by each receiver 3 is made while the container 5 is absent from the fluid dispenser 9, only its corresponding emitter 2 is switched on and external luminous interferences are avoided.

However, if the method adopted for detecting the height of the containers 5 involves other emitters 2 switched on during the reading of each receiver 3 in addition to the corresponding emitter 2, during the calibration readings, these emitters 2 must also be switched on to agree with the method employee.

Additionally, the reading of a value below, with a certain margin of safety, from the minimum displayed by a receiver 3 in total darkness with all emitters 2 switched off or from a value above, with a certain margin of safety, from the value displayed by a receiver 3 with its respective emitter 2 switched on and unobstructed it can be understood by the controller as a malfunction of emitter 2, receiver 3 or system 1.

As a result, there is a possibility of reporting this possible malfunction through a status interface (not shown), such as, for example, changing the color of a status LED from blue to red. It is worth noting the need to assess whether there are other phenomena that cause similar effects on the values presented before considering them as a sign of malfunction.

In an embodiment, determining the height of the container 5 comprises switching on and off with a sequence each emitter 2 among the plurality of emitters 2 and perform the reading of the luminous intensity from a receiver 3 corresponding to the emitter 3 switched on.

In another embodiment of the invention, determining the height of the container 5 comprises sequentially and individually switching on and off each emitter 2 among the plurality of emitters 2 and perform the reading of the luminous intensity from a receiver 3 corresponding to the emitter 3 switched on.

Advantageously, sequentially and individually switching on and off each emitter 2 avoids possible interferences in the reading of the luminous intensity caused by other emitters 2, allowing emitters 2 with wide focus that reach more than one receiver to be used. The sequence of activation of the emitters can obey a predetermined order or it can be random.

Alternatively, the activation sequence of the emitters 2 can be carried out without prejudice by switching on more than one emitter 2 at a time if the emitted electromagnetic radiation beams do not interfere with receivers 3 not intended for them. For example, emitters 2 at opposite ends of column 14 can be switched on at the same time, which can also reduce the time required to perform all readings.

In addition, if only part of the emitters 2 that do not correspond to a receiver 3 that interfere with it are not switched on at the moment of their reading, it is still possible to reduce interference in view of all emitters 2 switched on at the same time.

Furthermore, it is possible to extend the useful life, avoid self-heating, and also, in the case of certain types of emitters 2, such as most LEDs, allow the use of a much greater electrical current when switching on the emitters 2 for short periods of time instead of continuously, as well as reducing the consumption of electrical energy and, consequently, the power required for a power supply. By avoiding the self-heating of electronic components by establishing intervals for their operation, it is possible to obtain major improvements in the consistency of sensor readings.

For example, certain types of LEDs can be used with electrical currents 15 times greater if switched on for less than 100 μs and waiting a minimum time before switching them on again, which makes the electromagnetic radiation from other sources a fraction less than total. As for self-heating, when leaving certain emitters 2 switched on half the time instead of continuously, for example, it is already possible to find advantages.

Alternatively, both the step of switching on emitters 2 for short periods and the step of switching them on sequentially can be replaced by forms of modulation, activation at a certain frequency, or use of pulses in order to achieve the presented advantages.

In addition, a time interval can be waited after switching on a given emitter 2 before performing the reading of the corresponding receiver 3, with the time interval corresponding to the stabilization of the intensity of the electromagnetic radiation emitted by at least one respective emitter 2 or the value displayed by the receiver 3.

Such an interval varies a lot depending on the component, with some examples being up to 10 ns, up to 800 ns and up to 1 ms. In addition, some LDRs (Light Dependent Resistors) may have a memory effect, which can delay their return to the electrical resistance value corresponding to the dark after removing a luminous source, which can cause problems for the function of the system 1.

In an embodiment of the present invention, the controller is configured to control the flow of liquid to the container by means of the release of the flow of liquid if the height of liquid in the container is less than the desired height of liquid and interrupting the flow of liquid if the height of liquid in the container is greater than or equal to the desired height of liquid.

In an embodiment of the present invention, the controller is configured to control the flow of liquid to the container by means of the release of the flow of liquid only if the presence sensor 8 detects the presence or correct positioning of the container S.

In an embodiment of the present invention, there is an option to disable autonomous filling via the user interface 6 or another interface. A rotary selector can be used which, when pressed, acts as an on-off button in autonomous mode, for example. In addition, the presence sensor 8 can have the function of directly switching on and off the flow of liquid.

The controller can also comprise electronic components such as relays, transistors and solid-state relays configured to switching on and off components that require incompatible electrical currents or voltages, such as the drive device, emitters 2 and receivers 3. In order to save energy and save components, the emitters 2 and receivers 3 can only be switched on during the use of the system 1 or at the moment of measuring the height of the container 5. Furthermore, the controller can be configured to switch off emitters 2 or receivers 3 during part of the filling cycle.

The controller can also be connected to a multiplexer module to be able to perform the reading of several receivers 3 and control several emitters 2.

In another embodiment, system 1 comprises an sound device connected to the controller and configured to emit an sound signal in response to the performance of any procedure related to the filling of the container 5, such as, for example, the beginning of the filling or ending of the filling, that is, if the height of liquid in the container 5 has become equal to or greater than the desired height of liquid.

In order to compensate for possible losses of precision or accuracy of the distance sensor 11 caused by the lack of uniformity on the liquid surface or by other factors, the controller can be additionally configured to determine the height of liquid in the container 5 by means of the average, which can be arithmetic, geometric or other, from a plurality of measurements from the distance sensor 11. As an example, the plurality of measurements may comprise from 2 to 50 measurements.

In addition, the controller can be additionally configured to request new measurements from the distance sensor 11 if a measurement among one or more measurements is outside a reference standard, for example, if a measurement is greater than the distance from the sensor 11 up to the base 7. As an example, the new measurements can comprise from 1 to 50 measurements.

Alternatively, the controller can be configured to assign a minimum height of water and a margin of safety from the top of the container. As a result, the user interface 6 allows the choice of a height of water between the minimum height and the height of the container minus the margin of safety, which prevents the imprecisions or inaccuracies of the distance sensor 11 from causing overflows. The values of the minimum height of the water column and the margin of safety of the top of the container can be changed according to the manufacturer's preference.

In an embodiment of the present invention, the controller can be configured to trigger and interrupt the flow of liquid to container 5 once per filling cycle, requiring that the next activation of the flow of liquid be carried out only after withdrawal and new receipt or movement of the container 5 in the fluid dispenser 9. In this way, the system 1 is prevented from interleaving between releasing and interrupting the flow of liquid due to possible inaccuracies of the sensors.

Advantageously, the present system 1 is capable of filling without overflowing containers of different materials, shapes and sizes, as it adapts, autonomously, the amount of liquid to be placed according to the container 5 used.

In addition, the use of emitters 2 with broad electromagnetic radiation beams to the point of reaching not corresponding receivers 3 and with a lower concentration of luminosity due to the wider focus if compared to lasers, for example, such as LEDs, is satisfactorily compensated, for example, by arranging the emitters 2 and receivers 3 on the bottom of grooves 10 coated with low-reflexivity material to portions of the electromagnetic spectrum, switching on and off the emitters 2 sequentially and individually and assigning specific reference values for each receiver 3, which improves the consistency of the readings obtained.

In this manner, the counter intuitive use of emitters 2 with a wider or divergent focus, such as LEDs, in relation to lasers and laser diodes, not only does not impair the functioning of the system 1, but also provides the great advantage of dispensing the need for a cautious alignment of emitters 2, so that their beams reach correctly the receivers 3, which can easily make large-scale production unfeasible or make it very expensive because it depends on very precise emitters.

In order to dispense the need for a precise alignment between emitters and receivers, the focus area of the emitter 2 used must be large enough to, despite deviations due to lack of uniformity in the components or in the system 1, allow its electromagnetic radiation beam reaches, with adequate intensity, its corresponding receiver 3.

Such deviations do not usually exceed 2 cm, with this, focus with areas with diameters greater than 2 cm or with medium intensity angles greater than 3 degrees are usually sufficient to allow operation without a careful alignment.

In an embodiment, emitters 2 comprise a half-intensity angle between 3 degrees and 90 degrees.

In order to make better use of the electromagnetic radiation emitted and to maintain a high luminous intensity reaching the receiver 3, it is interesting that the focus is not so wide, having, for example, angles of half intensity below 60 degrees.

By proposing the use of emitters of this type, the present invention also allows ubiquitous emitters 2, of low-cost and high-durability, such as infrared LEDs, to be used.

It is worth noting that, for a good functioning of the system 1, the response time of emitters 2, receivers 3, distance sensor 11, controller and of the related circuits must be compatible with each other. Depending on the arrangement used, it is possible to perform more than dozens of cycles per second, although numbers such as 5 cycles per second may already be adequate and appear to be instantaneous to the user.

It should be noted that the supply of all components that require electricity is done directly or indirectly by a power source (not shown).

It should be noted that system 1 does not exclude the possibility of applying traditional filling methods, such as buttons or mechanical sensors, next to the dispenser 9 in order to provide the possibility of manually filling a container 5.

Figure 8:
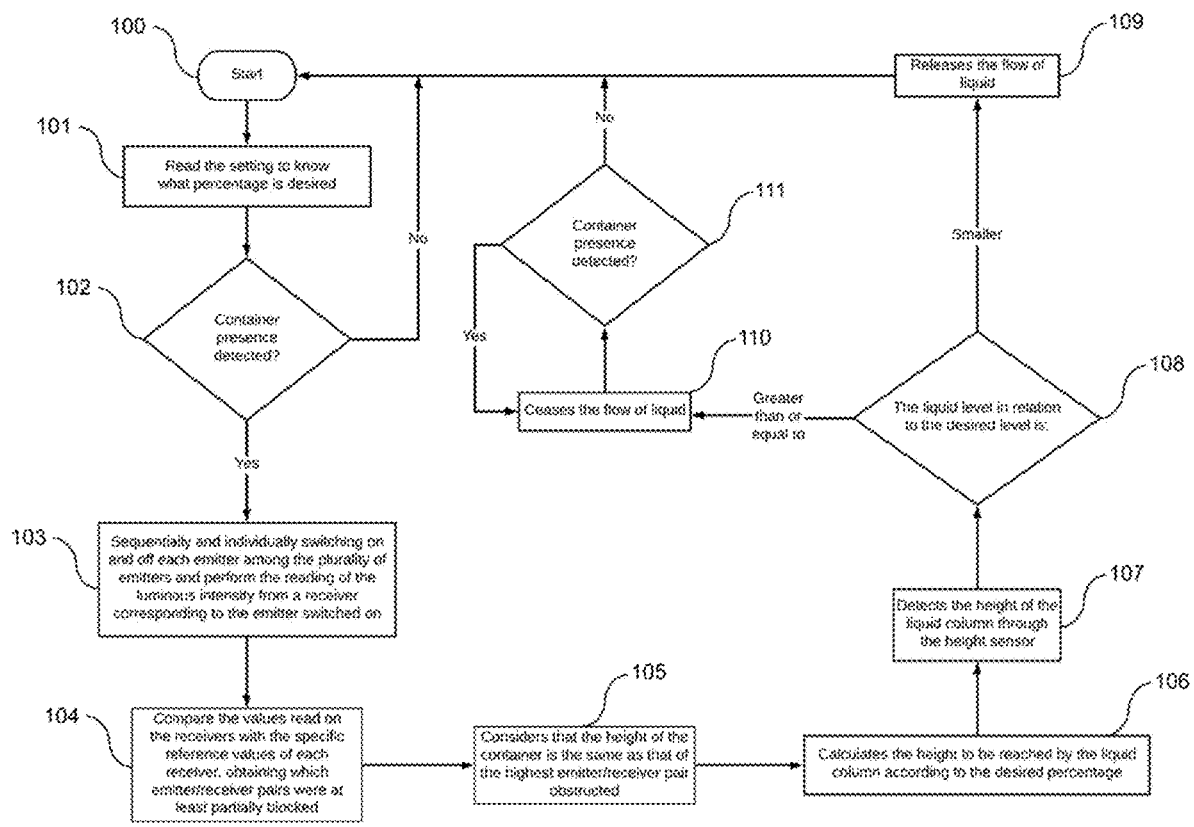
FIG. 8 shows a flow chart of the method for autonomous filling of a container, object of the present invention.

FIG. 8 shows a flow chart of the method for autonomous filling of a container, object of the present invention. The flow chart contains the following, blocks:

100: Start

101: Read the setting to know what percentage is desired

102: Container presence detected?

103: Sequentially and individually switching on and off each emitter among the plurality of emitters and perform the reading of the luminous intensity from a receiver corresponding to the emitter switched on 104: Compare the values read on the receivers with the specific reference values of each receiver, obtaining which emitter/receiver pairs were at least partially blocked 105: Considers that the height of the container is the same as that of the highest emitter/receiver pair obstructed 106: Calculates the height to be reached by the liquid column according to the desired percentage 107: Detects the height of the liquid column through the height sensor
108: The liquid level in relation to the desired level is:
109: Releases the flow of liquid
110: Ceases the flow of liquid
111: Container presence detected Despite the description of the particular embodiment above referring to a particular example, the present invention can be carried out in analogous ways, being able to present modifications in its form of implementation, so that the scope of protection of the invention is limited only by the content of the attached claims, including all possible equivalent variations linked to the method and the system.

What is claimed is:

1. A system, comprising:
    a fluid dispenser;
    a distance sensor;
    a plurality of electromagnetic radiation emitters and receivers;
    a user interface configured to receive a desired percentage of the height of the container to be filled with liquid; and
    a controller electronically connected to the distance sensor, the plurality of electromagnetic radiation emitters and receivers, the user interface and the fluid dispenser;
    wherein the controller is configured to:
        determine the height of the container from the plurality of electromagnetic radiation emitters and receivers;
    wherein determining the height of the container comprises:
        switching each emitter on and off among the plurality of electromagnetic radiation emitters and performing the reading of the luminous intensity from a receiver corresponding to the emitter switched on; determine the height of the container based on at least one receiver that had luminous intensity readings within an individual reference range;
        determining the height of liquid in the container from at least one measurement of the distance sensor;
        determining a desired height of liquid in the container based on the height of the container and the desired percentage of the height of the container to be filled with liquid;
        comparing the height of liquid in the container and the desired height of liquid;
        controlling a flow of liquid from the dispenser to the container based on the height of liquid in the container and the desired height of liquid; and
        perform a calibration of the receivers by reading the readings presented by the receivers and subtracting a safety margin from the reading of each one of them to obtain individual reference values, wherein the individual reference values automatically determine individual reference ranges with a safety margin for each receiver.

2. The system of claim 1, wherein determining the height of the container comprises sequentially switching on and off subsets of the plurality of electromagnetic radiation emitters and performing the reading of the luminous intensity from a receiver corresponding to the subset of the plurality of electromagnetic radiation emitters switched on at each time.

3. The system of claim 1, wherein determining the height of the container comprises sequentially and individually switching on and off each emitter among the plurality of electromagnetic radiation emitters and performing the reading of the luminous intensity from a receiver corresponding to the emitter switched on at each time.

4. The system of claim 1, wherein the emitters and receivers arranged in a total of three or more columns, with each column comprising emitters, receivers, or both.

5. The system of claim 1, wherein the plurality of electromagnetic radiation emitters are configured to emit electromagnetic radiation with a peak within the range of 850 nm to 940 nm.

6. The system of claim 1, wherein the plurality of electromagnetic radiation emitters are configured to emit electromagnetic radiation beams with a half-intensity angle between 3 degrees and 90 degrees.

7. The system of claim 1, wherein the emitters are configured to detect partial variations in the electromagnetic radiation beams emitted by the emitters and to pass that intensity measurement to the electronically connected controller.

8. The system of claim 1, wherein the fluid dispenser comprises grooves, in which the receivers are positioned inside the grooves.

9. The system of claim 8, wherein the grooves comprise coated walls;
    the groove coating material comprising paint or materials with reflectivity below 50% of the portion of the electromagnetic spectrum being measured by the receivers.

10. The system of claim 1, wherein the at least one receiver which has readings of luminous intensity within an individual reference range is the receiver (3') located in the highest position vertically in relation to a base of the dispenser that had readings of luminous intensity within an individual reference range; the distance between the receiver (3') and the base corresponding to the height of the container.

11. The system of claim 1, wherein the individual reference range of a receiver is determined by a reading of the luminous intensity when the container is absent from the fluid dispenser, its corresponding emitter is switched on and external luminous interference is avoided.

12. The system of claim 1, wherein the controller is configured to activate and interrupt the flow of liquid to the container once per filling cycle, requiring that the next activation of the flow of liquid is carried out only after the removal and new receipt or movement of the container in the fluid dispenser.

13. The system of claim 1, wherein the controller is configured to perform the calibration of the reference ranges of the receivers when starting the system or when being manually activated to perform the calibration.

14. The system of claim 1, wherein the receivers are encapsulated in a material that filters electromagnetic radiation with wavelengths different from those emitted by the emitters.

15. The system of claim 1, characterized by comprising a water-repellent or hydrophobic treatment on the surfaces that isolate a chamber of the dispenser from the emitters and receivers.

16. A method, comprising:
    determine the height of the container from a plurality of electromagnetic radiation emitters and receivers;
    wherein determining the height of the container comprises:
        sequentially switching emitters on and off individually or in groups among the plurality of electromagnetic radiation emitters and performing the reading of the luminous intensity from an individual or group of receivers corresponding to the individual or group of emitter switched on;

determine the height of the container based on at least one receiver that had luminous intensity readings within an individual reference range for each receiver;

performing a calibration of the at least one receiver by analyzing a reading received by the receiver and subtracting a safety margin from the reading to obtain individual reference values, wherein the individual reference values automatically determine individual reference ranges with a safety margin for the at least one receiver;

determining the height of liquid in the container from at least one measurement of a distance sensor;

determining a desired height of liquid in the container based on an input received via a user interface;

comparing the height of liquid in the container and the desired height of liquid; and controlling a flow of liquid from a fluid dispenser to the container based on the height of liquid in the container and the desired height of liquid.

* * * * *